United States Patent

Khutoretsky et al.

[11] 4,091,528
[45] May 30, 1978

[54] METHOD OF ELECTRIC MACHINE ASSEMBLY

[76] Inventors: Garri Mikhailovich Khutoretsky, Altaiskaya ulitsa 20, kv. 5; Anatoly Timofeevich Zverev, Budapeshtskaya ulitsa 31, korpus 1, kv. 58; Tamara Nikolaevna Belova, Budapeshtskaya ulitsa 3, korpus 2, kv. 138; Jury Alexeevich Bazarov, Budapeshtskaya ulitsa 15, korpus 2, kv. 11; Elrikh Iosifovich Gurevich, prospekt Kosmonavtov 50, korpus 4, kv. 72, all of Leningrad, U.S.S.R.

[21] Appl. No.: 777,404

[22] Filed: Mar. 14, 1977

[51] Int. Cl.² ............................................. H02K 15/00
[52] U.S. Cl. ......................................... 29/596; 310/42; 310/59; 310/214
[58] Field of Search ................... 29/596, 598; 310/42, 310/59, 58, 214

[56] References Cited

U.S. PATENT DOCUMENTS

| 3,719,988 | 3/1973 | Nielsen | 29/596 |
| 3,866,070 | 2/1975 | Madsen | 310/214 |

Primary Examiner—Carl E. Hall
Attorney, Agent, or Firm—Lackenbach, Lilling & Siegel

[57] ABSTRACT

A method of assembling an electric machine consists of placing a rotor within a stator having resilient inserts preassembled thereon. At least two ropes are secured to the inserts, each rope being passed through a radial ventilating duct of the stator. The ropes are secured to the top of said resilient insert immediately adjacent the rotor. Prior to assembly, each resilient insert is bent down to the core with the aid of said ropes.

3 Claims, 3 Drawing Figures

METHOD OF ELECTRIC MACHINE ASSEMBLY

The present invention relates to the field of electromechanical engineering and, more particularly, to methods of assembly and disassembly of turbo-generators.

The present invention can be most advantageously used when assembling turbo-generators and, more specifically, when placing a rotor within a stator having a number of axial rows of barriers extending into the clearance of the machine.

The development of turbo-generators is closely related to the progress in steam turbines, since it is the turbine, viz. its power rating and the speed of rotation, that is largely responsible the respective performance characteristics of turbo-generators and, therefore, influences the design thereof.

The development of electric machines has brought about the necessity of improving the methods of their assembly.

In the prior art methods of electric machine assembly the extending rows of barriers were not bent down, as a rotor was placed within a stator.

As the turbo-generators were developed, the designer's efforts were directed to reducing the equipment weight and size, as well as to increasing its operational economy and reliability. This was achieved both by properly dimensioning the turbogenerator for better use of high-performance active and structural materials, and by a substantial improvement of cooling systems.

Excellent performance resulted from the introduction of hydrogen cooling and, more recently, direct gas-and liquid cooling of turbo-alternator windings.

The development of turbo-generator cooling systems is one of the primary factors in the development of the turbo-generator, since the provision of adequate heat dissipation causes an increase in the unit power of the turbo-generator.

The cooling air circulation system within the machine has been subject to considerable modification. Purely axial, radial/axial and radial/tangential circulation systems have been employed.

It is a purely radial circuit that has come to be most commonly used, as it permits multi-parallel access of cold air over the length of the active part of the stator, which, in turn, contributes to the solution of the problem of cooling machines with a long core. At present, all the air-cooled turbo-generators, including small-capacity generators, are of the closed circulation loop type with water-air heat exchangers.

The turbo-generators have a stator core with a multi-jet radial ventilation system. When the rotor is cooled using the pattern of gas intake from the clearance, the multijet rotor ventilation system is matched to the multijet stator system.

Extensive work has been conducted towards intensification of the gas-cooling of rotors. To this end, separation rings were mounted on the body of the rotor at the junction of the cold and hot areas. When the rings are installed on the rotor, equalization of the gas temperature occurs in the clearance along the machine and, consequently, reduction of the average and maximum copper temperature is obtained. The rotors with such barrier rings are not yet commercially produced, since they are not economical as yet.

In further investigations of the cooling systems, barriers in the air gap were provided on the stator side at the interface between the cold and hot gas compartments in the stator bore. The barriers occupy about 0.6 to 0.8 of the air gap height. They enclose an angle of 300° of the stator bore, leaving 60° for insertion of the rotor within the stator in accordance with the conventional assembly procedure.

The use of barriers in the stator bore provides for an additional increase of 30 percent in the capacity.

Since the use of the barriers in the stator bore is an important factor, they are provided on all the two-pole turbo-generators having a capacity equal to or exceeding 800 MW. In the description that follows by "one of the barrier rows" is meant a resilient insert made of oil-resistant, corona-proof, heat-resistant rubber. It is inserted into special sockets in the stator slot wedges and secured thereto.

In the present alternating-current electric machines with direct gas-cooling of the stator core and the rotor winding, the rotor is cooled by self-ventilation from the gap, and the stator has a single-jet exhaust circulation of the coolant gas.

In some prior art electric machines, the slot wedges for retaining the stator winding have been made to extend into the air gap. It is also known that in order to improve the cooling of the rotor windings, it is necessary to provide several rows of barriers on the stator side along its axis, which might bridge the electric machine air gap to as large an extent as possible. This permits reduction of the tangential velocity of the gas in the air gap and, consequently, increases the gas flow through the rotor winding.

The slot wedges of the prior art designs have been made both of uniform material, with a tangentially bent portion extending into the air gap, and as a composite in height, wherein one portion, in the air gap area, is composed of a resilient material, while the other portion, in the slot, is composed of a rigid material.

The slot wedges, composite in height, have an advantage over the uniform wedges, since they are capable of bridging the air gap to a larger extent and providing better conditions for cooling the turbo-alternator.

The aforementioned stator slot wedges with resilient inserts, however, cannot be utilized in turbo-alternators whose rotors include wedges of different height, distributed over the cooling areas and projecting from the rotor body surface by a greater amount, as well as retaining rings. Conventional methods of assembling electric machines fail to provide for a reliable placing of the rotor into the stator with resilient inserts, for in this case, as the rotor is slipped in, the slot wedge-mounted resilient inserts would be sheared and deformed by the projecting parts of the rotor. Herein and in the description that follows, the term "projecting parts of the rotor" is employed to define the projecting rotor wedges forming annular areas and retaining rings.

It is an object of the present invention to provide a method ensuring reliable assembly of an electric machine.

Another object of the present invention is to provide a method such as to allow the use of resilient inserts made of a material not possessing the required resilience for reassuming of the initial operating position.

Still another object of the present invention is to provide a method permitting control of the resilient insert reassuming its initial operating position.

With the aforementioned and other objects in view, the present invention resides in laying a winding in the slots of a stator core provided with radial ventilating ducts, retaining said winding in place by slot wedges, some of the slot wedges having preassembled resilient inserts, and slipping the rotor into the assembled stator. In accordance with the invention, prior to placing the rotor, within the stator, at least two ropes are passed through the ventilating ducts, each of the ropes being attached to the top of the resilient insert, and each insert being bent toward the core with the aid of the ropes.

The proposed method permits assembly of an electric machine without damaging the resilient inserts. This results in a higher reliability of the manufacturing assembly operations and permits the rotor to be readily slipped into the assembled stator.

Easy insertion of the rotor into the assembled stator is carried out by simultaneously bending the resilient inserts toward the stator core by the ropes secured to the top of one of the sides of the resilient insert.

It is desirable that the ropes of first and second sets of ropes be secured to the top of the resilient insert on opposite sides thereof, so that the bending force exerted on the resilient insert due to the effect of the first set of ropes might be directed oppositely to the bending force exerted on the resilient insert due to the effect of the second set of ropes. Thus, it became possible to make the resilient insert of a material lacking the required resilience for reassuming the initial operating position.

Both in the previous description and hereinafter, by "initial operating position" is meant the position of the resilient insert which it reassumes under the influence of inherent elastic forces, as shown in FIG. 3.

To provide control of the constant tension of the ropes which adjust the vertical position of the resilient insert with respect to the stator axis, the ropes mentioned are attached to the stressed stator frame by means of springs. In one embodiment of the present invention, at least two grooves are preformed in the resilient insert to receive pins for securing the ropes.

The present invention improves the efficiency of using conventional electric machines, in which some of the slot wedges retaining the stator winding extend into the air gap, thus providing for substantially complete bridging of the latter. It permits reduction of the tangential gas velocity in the air gap and results in an increase in the gas flow-rate through the rotor winding, contributing to its better cooling.

Other objects and advantages of the present invention will become apparent from the following detailed description of the method of assembling an electric machine in a stator frame, and an embodiment of the method taken in conjunction with the accompanying drawings in which.

Figure 1:
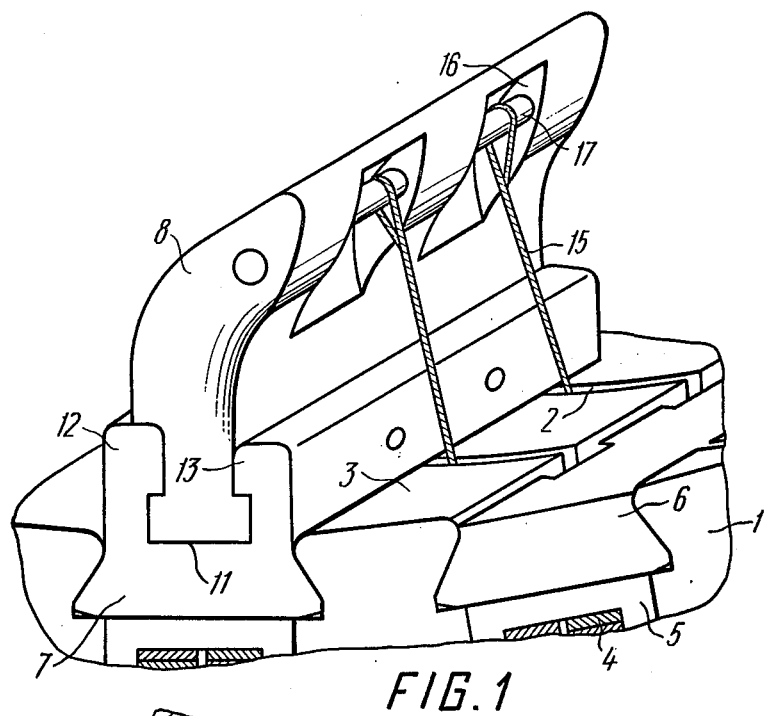
FIG. 1 is a partial perspective view of the stator, according to the invention.

The method of assembling an electric machine, in accordance with the invention, consists of gradually slipping a rotor having projecting parts in the form of retaining rings and projecting wedges defining annular areas into the stator frame. The inner part of the stator frame comprises a core 1 (FIG. 1) of active steel provided with radial ventilating ducts 2 between stacks 3; and a winding 4 disposed in slots 5 and held in place by means of rigid slot wedges 6.

Figure 2:
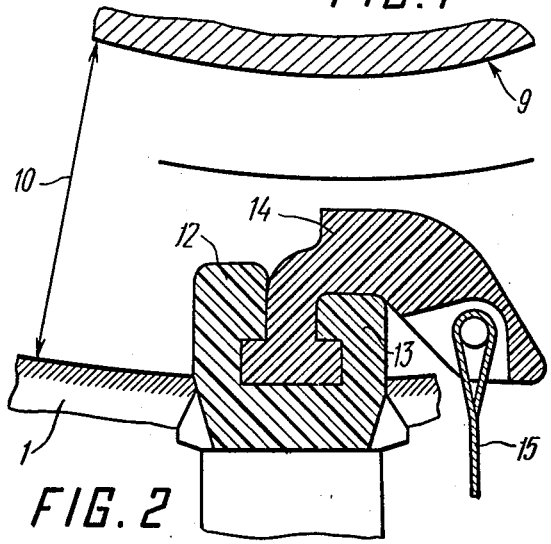
FIG. 2 is a cross-sectional view of the slot wedge and the resilient insert, as the rotor is placed within the stator.

Disposed in some of the core slots, depending on the machines ventilation system, are wedges 7 provided with resilient inserts 8 bent in the direction of rotation of the rotor 9 (FIG. 2).

Each resilient insert 8 extends into an annular air gap 10 between the core 1 and the rotor 9, and is mounted within a groove 11 (FIG. 1) in the wedge 7, defined by fillets 12, 13 (FIG. 2). In addition, the resilient inserts 8 have a stop lug 14 and are supported by the stop fillet 12, protruding above the stator core by a greater amount than does the fillet 13.

In one embodiment of the resilient insert 8, it is secured by a first set of ropes 15 (FIG. 3) passed through the radial ventilating ducts 2 (FIG. 1). The ropes 15 are fastened within grooves 16 by pins 17.

In another embodiment of the resilient insert 8, it is secured both by a first and a second set of ropes 15, 18 (FIG. 3) passed through the aforementioned ventilating ducts 2 (FIG. 1). The ropes 15 and 18 are fastened within different grooves 16 (FIG. 3) by means of pins 17.

In both of the embodiments, the other ends of the ropes are attached to the outer frame of a stator 19 (FIG. 3), for example, to the ribs thereof.

The above embodiments of securing the resilient insert 8 (FIG. 3) to the outer frame of the stator 19 are preferably realized using springs 20 which serve to ensure the desired tension of the ropes 15, 18 in the operating position and to control the tension after the rotor 9 has been placed within the stator frame.

Prior to leading the rotor 9 into the stator frame, the resilient inserts 8 (FIG. 1) are bent down to the core 1 (FIG. 2) of the stator by means of the first set of ropes 15 secured in position, and then the rotor 9 is led in. In this bent-down condition, the height of the resilient insert 8 above the core is chosen such that the projecting parts of the rotor, as it is slipped in, would pass without interference by the resilient inserts.

After the rotor 9 has been moved into the stator, the ropes 15 of the first set of ropes are released and the resilient inserts restored to their initial operating position by the influence of inherent elastic forces. The correct initial operating position of the resilient inserts 8 is then controlled by tensioning the spring 20 (FIG. 3) of the first set of ropes 15.

Figure 3:
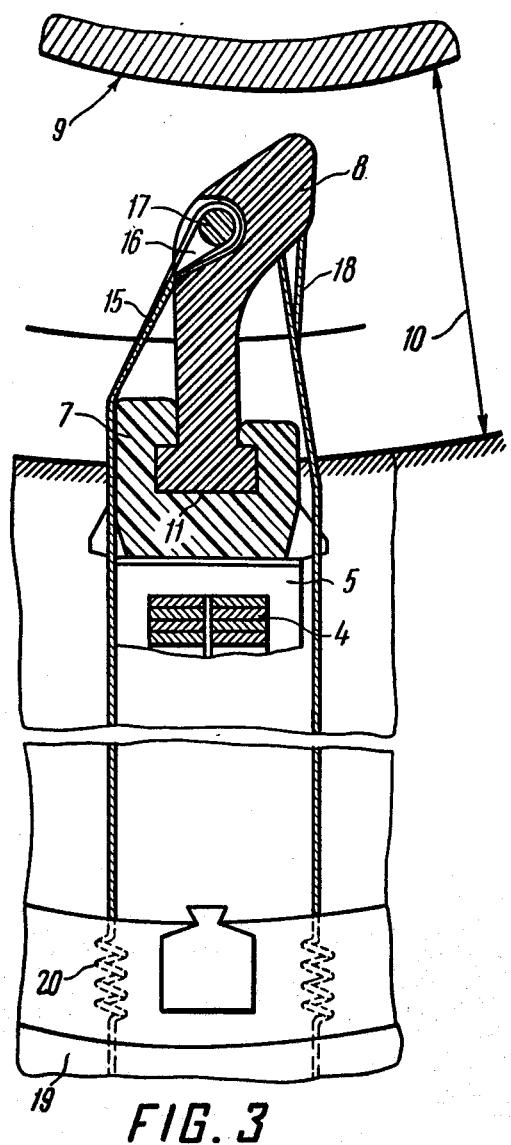
FIG. 3 is a cross-sectional view of the electric machine stator and the resilient insert in the initial operating position.

In case the material of the resilient insert 8 lacks the required resilience and fails to provide recovery of the original operating position thereof, it is advisable to use two sets of ropes 15 and 18. (FIG. 3). It is then possible to achieve the original operating position of the resilient inserts 8 by means of the second set of ropes 18.

The correct original position is controlled by the tension of the spring 20 (FIG. 3) of the second set of ropes 18 (FIG. 3).

Access to the springs 20 attached to the outer frame of the stator is made through ventilation windows extending axially in the stator ribs between the frame and the core (not shown).

This method of assembling the electric machine prevents the resilient inserts from being damaged as the rotor is placed within the stator. Furthermore, both methods of bending the resilient inserts make it possible to regulate the radial gap between the resilient member and the rotor, depending on the operational conditions and load of the dynamoelectric machine. Moreover, the method described is easy and reliable to use, and it can be employed in turbo-generators having rotors with projections above the body thereof.

We claim:

1. A method of assembling an electric machine, comprising the steps of:

passing at least two ropes through radial ventilating ducts arranged within slots of a core of a stator;

attaching one end of each of said ropes to the top of resilient inserts, said inserts being mounted on slot wedges extending into an air gap defined by said stator and a rotor;

bending said resilient inserts toward said core of said stator, said slots of said core having a winding disposed therein and retained therein by said slot wedges; and placing said rotor within said stator of the electric machine while said inserts are inclined toward said core.

2. A method of assembling an electric machine according to claim 1, wherein said ropes are arranged on opposite sides of said resilient insert, so that the bending force exerted on said resilient insert by one of said ropes is directed oppositely to the bending force exerted on said resilient insert by the other one of said ropes.

3. A method of assembling an electric machine according to claim 1, wherein the other end of each of said ropes is secured to an outer frame of said stator by means of springs.

* * * * *